Patented Sept. 5, 1933

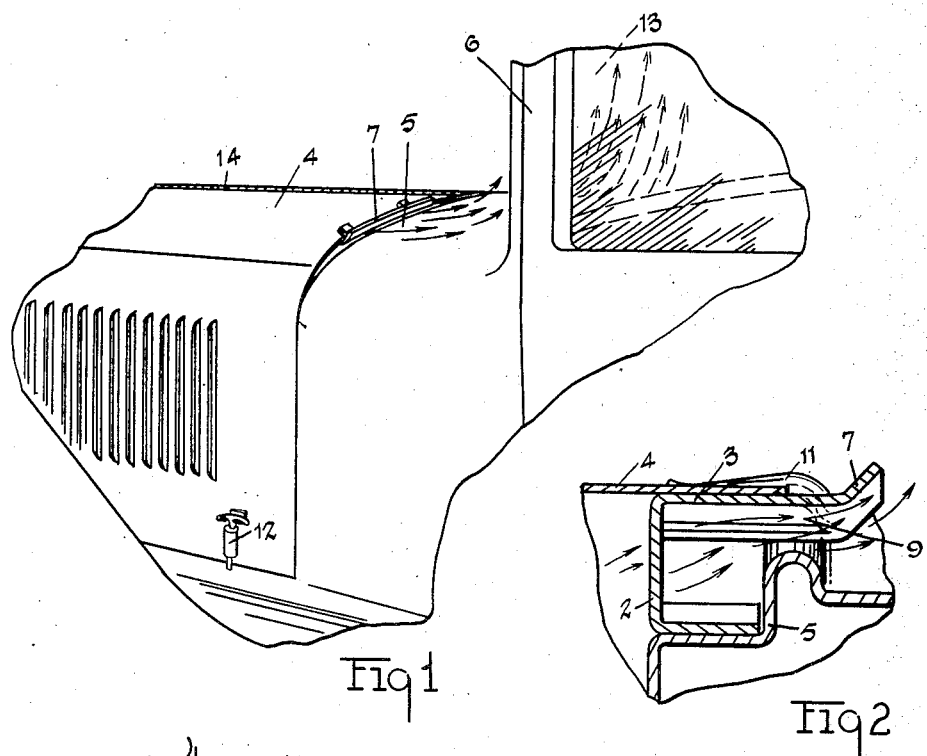

1,925,114

UNITED STATES PATENT OFFICE 1,925,114

WINDSHIELD HEATER

George J. Seiss, Toledo, Ohio

Application December 1, 1930. Serial No. 499,294

1 Claim. (Cl. 20—40.5)

My invention has for its object to provide a means for supplying heat to, and distributing it over, the surface of a windshield of a vehicle to prevent obscuring the visibility through the windshield by moisture, snow, or ice. My invention particularly provides a vent for directing the heat which may be given off by the engine of a motor driven vehicle to the surface of the windshield to maintain the windshield surface and the air, located in proximity to the windshield surface, at a relatively high temperature to produce rapid melting of snow or sleet and evaporation of moisture deposited on the windshield.

The invention may be contained in windshield heaters that vary in their details of construction and, to illustrate a practical application of the invention, I have selected a windshield heater containing the invention as an example of the various forms of structures that embody the invention, and shall describe the heater selected, hereinafter. The heater selected for the purpose of illustration is shown in the accompanying drawing.

Fig. 1 illustrates a perspective view of a vehicle showing the windshield in its installed position. Fig. 2 illustrates a cross section of the heater showing portions of the vehicle body with relation to the heater in its installed position. Fig. 3 illustrates a front view of the heater. Fig. 4 illustrates a view taken on the plane of the line 4—4 indicated in Fig. 3. Fig. 5 illustrates a modified end portion of the heater.

As is well known in connection with operating vehicles, such as automobiles, weather conditions and sudden changes of atmospheric temperatures often makes the operation of the vehicle one of great risk and endangers the safety of the occupants by causing a clouding of the windshield with condensed moisture, snow, or ice. Such conditions reduce visibility of the operator. The well known windshield wiper has been used but it has been found that such a device, although it will remove such particles of loose snow and ice as are located within its path, or sweep of operation, will not affect frozen ice or snow, nor will it remove the film of moisture which, although relatively thin, is very detrimental to clear vision. Films of this nature are often caused by the condensation of moisture prevailing in the air with which the windshield surface meets, the windshield surface being colder than the air. Also, the film is produced in closed cars on the inside surface of the windshield, and requires inside wiping of the windshield by the driver. The condensation on the inside of the windshield is also eliminated by my invention.

My invention provides a vent which may be located with reference to the engine of the vehicle so as to direct the heated air given off by the engine and directed backwardly by the fan of the engine over the surface of the windshield. The windshield heater shown, for purposes of illustration, is located on the edge of the hood cover which meets with the upper portion of the cowling when the hood cover is secured. The heater directs the heat to the parts of the windshield surface that will affect that part of the windshield through which vision of the road is obtained by the driver. The heated air moves toward the upper portions of the surface of the shield and will thus keep the air located near, or coming in contact with, the shell, and the windshield's surface at substantially a constant temperature, melting snow and ice and evaporating moisture, thereby eliminating condensation of moisture and the formation of a film on the outside of the windshield and also that formed on the inside of the windshield.

The windshield heater shown for purposes of illustration may be stamped from sheet metal to form a main bar 1. The main bar 1 has a brace member 2 which may be centrally located on the main bar to support a positioning bar 3. The positioning bar 3 may be slightly curved so as to conform substantially to the curve of a hood cover 4 and cowling 5 of a vehicle 6, to which it is to be installed. Air which may come in contact with the motor of the vehicle will be heated by the heat given off by the cylinder block and be blown backwardly by natural drafts caused by the movement of the vehicle, or by a draft caused by the cooling fan on the motor of the vehicle. The bar 3 has an up-turned lip portion 7 which fits about the edge of the hood cover 4, holding the windshield heater in position on the hood cover, and serves to direct the heated air backwardly with respect to the vehicle and towards the vehicle's windshield 13.

The ends of the main bar 1, and the positioning bar 3, may be secured together by means of sheet metal straps 8. The straps 8 operate to hold the bar 3 in its curved shape and form a suitable slit, or mouth, 9, between the main bar 1 and the bar 3 through which the heated air, from the motor of the vehicle 6, may pass. The windshield heater is located and supported on the inside of the hood cover 4 by means of suitable spring clips 10 which may be stamped from the bar 3. The clips 10 may be suitably covered and insulated by some cushioning casing 11, such as rubber, which will prevent friction and subsequent marring of the hood cover's finish.

The heater is installed by raising the hood cover 4 and slipping the clips 10 over the edge of the hood cover. The hood cover is then closed and anchored by means of the well known spring hood grips 12, locating the main bar 1 on the edge of the cowling 5. The spring hood grips 12, by reason of their resiliency, will adjust themselves and the hood cover to substantially fit about the positioning bar 3 without bending or damaging either the cowling 5 or hood cover 4. The edge of the hood cover 4 will be held away from its normal position along the cowling 5 by the positioning bar 3 and fits substantially about the curvature of the positioning bar. The heated air, indicated by the arrows in Figs. 1 and 2 will pass between the bars 1 and 3 through the mouth 9 and be directed backwardly towards the windshield 13, of the vehicle 6, by the lip portion 7.

In the modified form of the windshield heater illustrated in Fig. 5, the straps 8 are eliminated and the ends of the main bar 1 and positioning bar 3 are unconnected. This form of construction allows for installation of the windshield heater on cowling and hood cover of varying curvatures. The positioning bar 3 will assume any of the variable curves of the hood cover and will yet be supported by the brace member 2 in a position so as to direct the heated air towards the windshield. In constructions in which the straps 8 have been eliminated, the heater may be located relatively close to the pintle pin 14 of the hood cover 4 without bending the pin or lifting it from its socket. By locating the heater close to the pintle pin it will be also located above the motor of the vehicle and the air directed over it will contain more heat.

I claim:

In combination with a motor driven vehicle having a cowling and a hood cover, a windshield heater comprising a channel bar formed of sheet metal, a plurality of openings formed in the web of the channel bar, a plurality of struck-out tongues extending from one of the said walls of the channel bar, the ends of the tongues bent so as to incline toward the said wall, a rubber tube located about each of the tongues whereby the channel bar may be cushionly supported between the cowling and the hood to maintain the edge of the hood cover adjacent the cowling separated substantially only in that portion in which the channel bar is located and so as to direct the heat from the motor through the said plurality of openings in the channel bar.

GEORGE J. SEISS.